(12) United States Patent  
Chang

(10) Patent No.: US 8,947,872 B2  
(45) Date of Patent: Feb. 3, 2015

(54) HOLDING FRAME FOR HARD DISK DRIVE

(75) Inventor: Chin-Ming Chang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 258 days.

(21) Appl. No.: 13/597,562

(22) Filed: Aug. 29, 2012

(65) Prior Publication Data

US 2013/0148287 A1   Jun. 13, 2013

(30) Foreign Application Priority Data

Dec. 12, 2011   (TW) .............................. 100145840 A

(51) Int. Cl.
*H05K 7/14* (2006.01)
*G06F 1/16* (2006.01)

(52) U.S. Cl.
USPC ............ 361/679.33; 361/679.02; 361/679.34; 361/807; 361/825; 361/829; 361/730

(58) Field of Classification Search
CPC .................. G06F 1/187; G11B 33/128; G11B 33/123–33/124
USPC ........ 361/679.02, 679.33, 730, 807, 825, 829
See application file for complete search history.

(56) References Cited

U.S. PATENT DOCUMENTS

2004/0166712 A1*   8/2004   Chou ............................ 439/157
2010/0002366 A1*   1/2010   Pav ........................... 361/679.02

* cited by examiner

*Primary Examiner* — Robert J Hoffberg
*Assistant Examiner* — Mukund G Patel
(74) *Attorney, Agent, or Firm* — Novak Druce Connolly Bove + Quigg LLP

(57) ABSTRACT

A holding frame includes a base plate, a first resisting wall, a second resisting wall, two first elastic arms and two second elastic arms. The base plate includes a first surface and a second surface opposite to the first surface. The first resisting wall extends from the first surface, and the second resisting wall extends from the second surface. The two first elastic arms are formed on the first surface, and face the first resisting wall. The two first elastic arms and the first resisting wall define a first receiving space configured for receiving a first hard disk drive. The two second elastic arms are formed on the second surface, and face the second resisting wall. The two second elastic arms and the second resisting wall define a second receiving space configured for receiving a second hard disk drive.

4 Claims, 6 Drawing Sheets

HOLDING FRAME FOR HARD DISK DRIVE

BACKGROUND

1. Technical field

The disclosure generally relates to a holding frame for receiving two hard disk drives.

2. Description of the Related Art

Hard disk drives are used in electronic devices such as desktop computers. The hard disk drives need a holding frame to be mounted in the desktop computers.

However, the holding frame is only used for mounting one hard disk drive. Additionally, different-sized hard disks applied to the electronic device needs different corresponding holding frames. Thus, when a hard disk drive is replaced, another hard disk drive of a different size cannot always be fixed to the existing holding frame.

Therefore, there is room for improvement within the art.

BRIEF DESCRIPTION OF THE DRAWINGS

Many aspects of an exemplary holding frame can be better understood with reference to the following drawings. The components in the drawings are not necessarily drawn to scale, the emphasis instead being placed upon clearly illustrating the principles of the exemplary holding frame. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
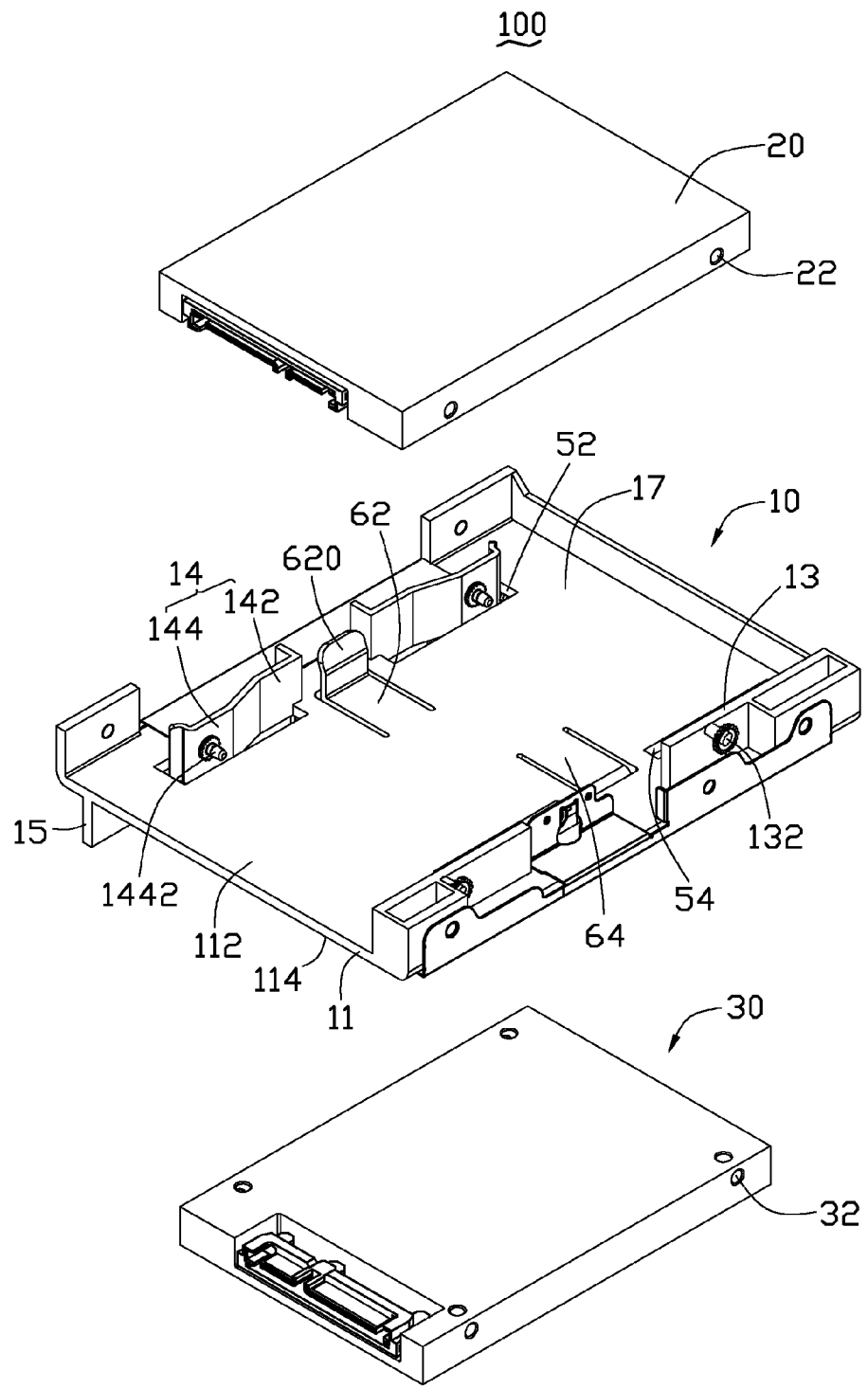
FIG. 1 is an exploded view of a holding assembly according to an exemplary embodiment.
Figure 2:
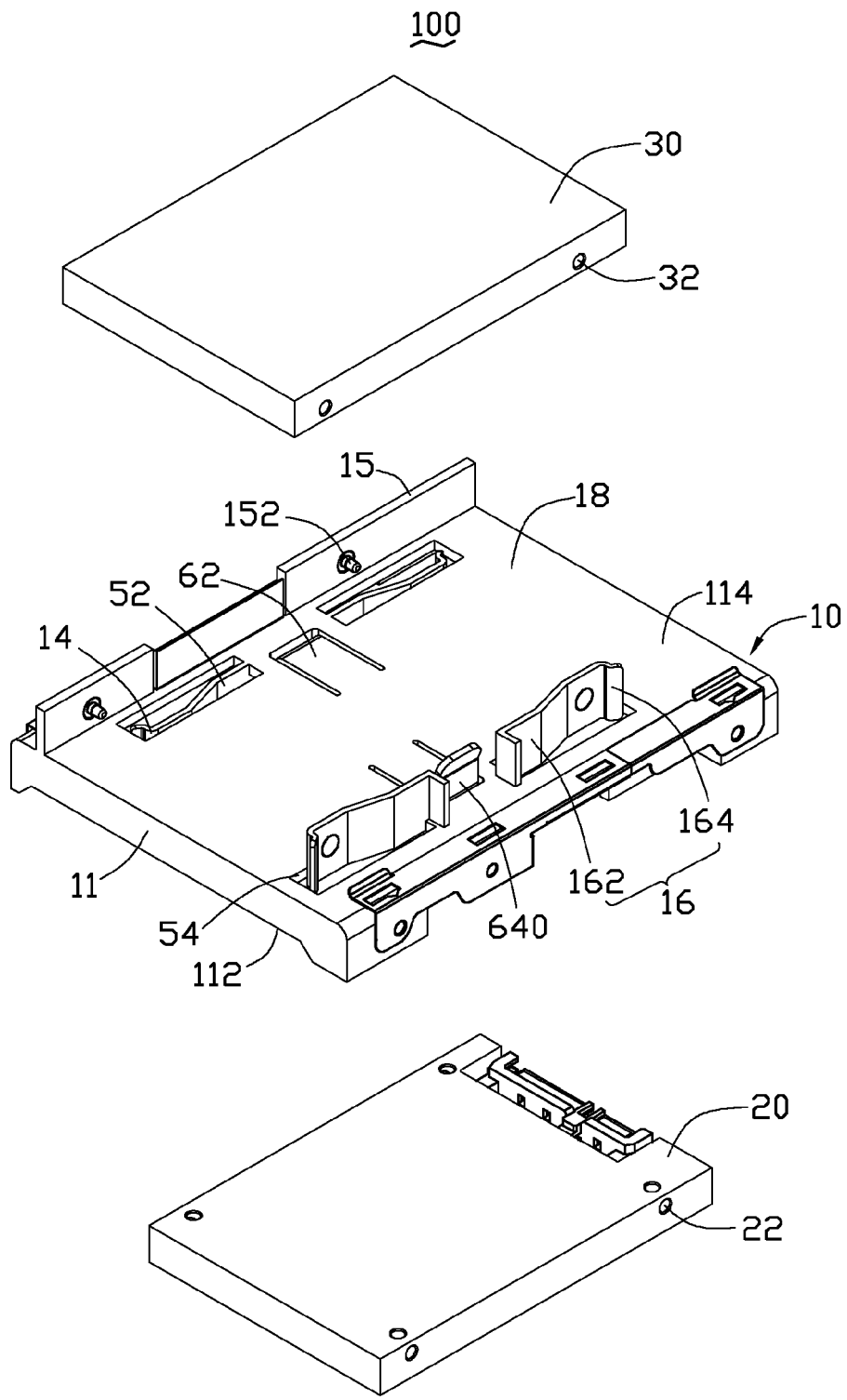
FIGS. 2 and 3 are similar to FIG. 1, but viewed from other aspects.
Figure 3:
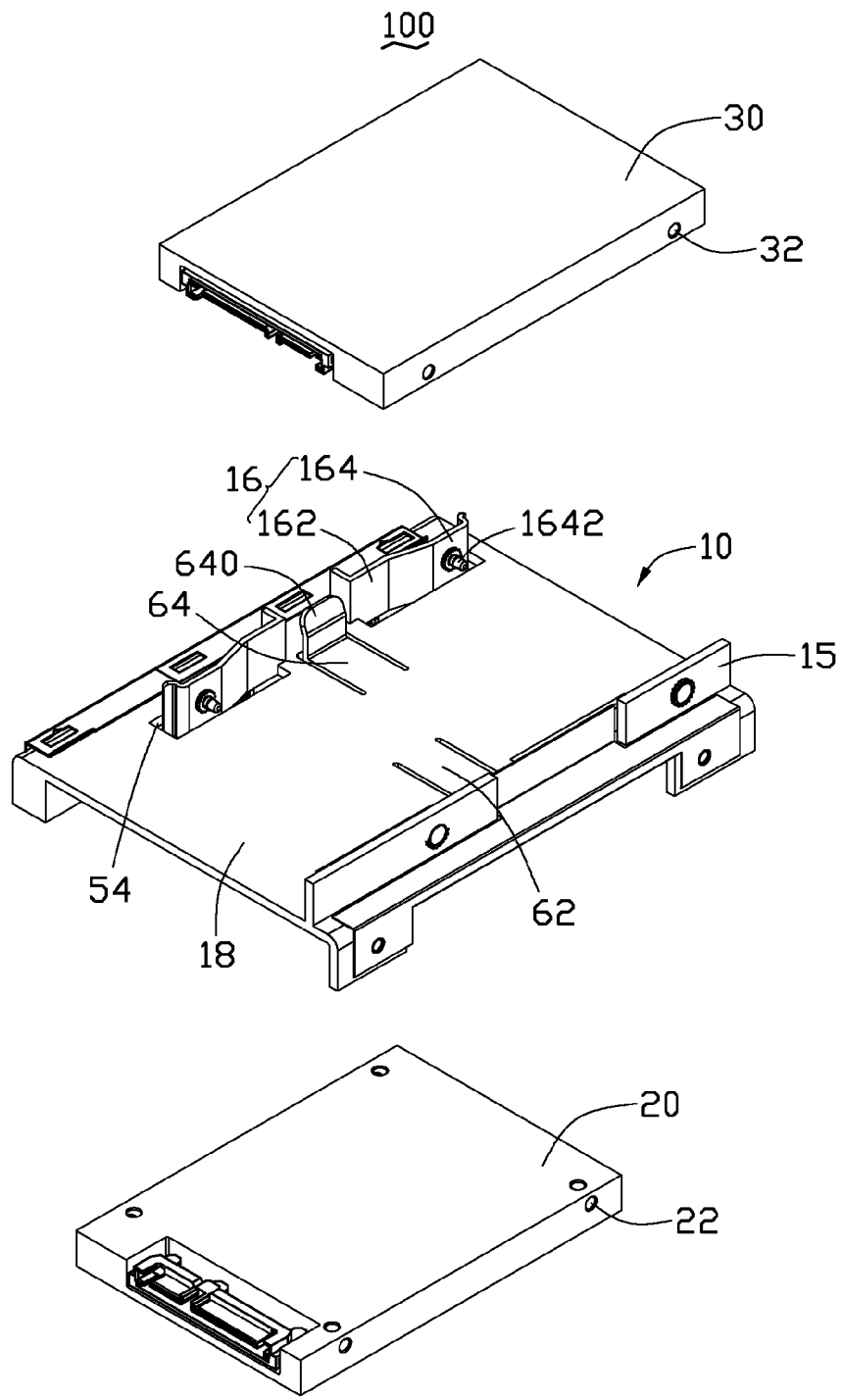

FIGS. 1 to 3 show an exemplary embodiment of a holding assembly 100 used in an electronic device. The holding assembly 100 includes a holding frame 10, a first hard disk drive 20, and a second hard disk drive 30. The first hard disk drive 20 and the second hard disk drive 30 are removably mounted to the holding frame 10 to electrically connect to the electronic device. The first hard disk drive 20 defines two holes 22 at each of two sides thereof. The second hard disk drive 30 defines two holes 32 at each of two sides thereof.

The holding frame 10 includes a base plate 11 with a first surface 112 and a second surface 114 opposite to the first surface 112. A first resisting wall 13 extends from one side of the first surface 112, and a second resisting wall 15 extends from one side of the second surface 114. The first resisting wall 13 and the second resisting wall 15 are symmetrically reversed. Two first slots 52 and two second slots 54 are defined in the base plate 11. The first slots 52 are adjacent to the second resisting wall 13, and the second slots 54 are adjacent to the first resisting wall 13.

A first elastic arm 14 is integrally formed at each first slot 52. One side of each first elastic arm 14 is coplanar with the second surface 114, and the other side of the each first elastic arm 14 protrudes from the slots 52 toward the first surface 112. A second elastic arm 16 is integrally formed at each second slot 54. One side of each second elastic arm 16 is coplanar with the first surface 112, and the other side of each second elastic arm 16 protrudes from the second slot 54 toward the second surface 114. A first cantilever plate 62 and a second cantilever plate 64 are formed on the base plate 11. The first cantilever plate 62 is positioned between the first elastic arms 14, and the second cantilever plate 64 is positioned between the second elastic arms 16. A first tab 620 extends from a distal end of the first cantilever plate 62. A second tab 640 extends from a distal end of the second cantilever plate 64. The first resisting wall 13, the first elastic arms 14 and the first tab 620 cooperatively define a first receiving space 17 for receiving the first hard disk drive 20. The second resisting wall 15, the second elastic arms 16 and the second tab 640 cooperatively define a second receiving space 18 for receiving the second hard disk drive 30.

The first resisting wall 13 has two pins 132. The pins 132 of the first resisting wall 13 are configured for being inserted into the holes 22 for mounting one side of the first hard disk drive 20 to the first resisting wall 13. The second resisting wall 15 has two pins 152. The pins 152 of the second resisting wall 15 are configured for being inserted into the holes 32 for mounting one side of the second hard disk drive 30 to the second resisting wall 15.

The first elastic arms 14 and the first tab 620 face the first resisting wall 13. In the exemplary embodiment, each first elastic arm 14 includes a tilted plate 142 and a mounting plate 144 integrally formed together. A first rivet 1442 is formed at the mounting plate 144 for mounting in each of the two holes 22 at another side of the first hard disk drive 20. The first elastic arms 14 can be deformedly pressed in the first slots 52 to allow the first elastic arms 14 to move away from the first resisting wall 13 to enlarge the first receiving space 17 for conveniently assembling the first hard disk drive 20. Each second elastic arm 16 is similar to the first elastic arms 14, and includes a tiled plate 162 and a mounting plate 164. A second rivet 1662 is formed at the mounting plate 164 for mounting in each of the two holes 32 at another side of the second hard disk drive 30.

Figure 4:
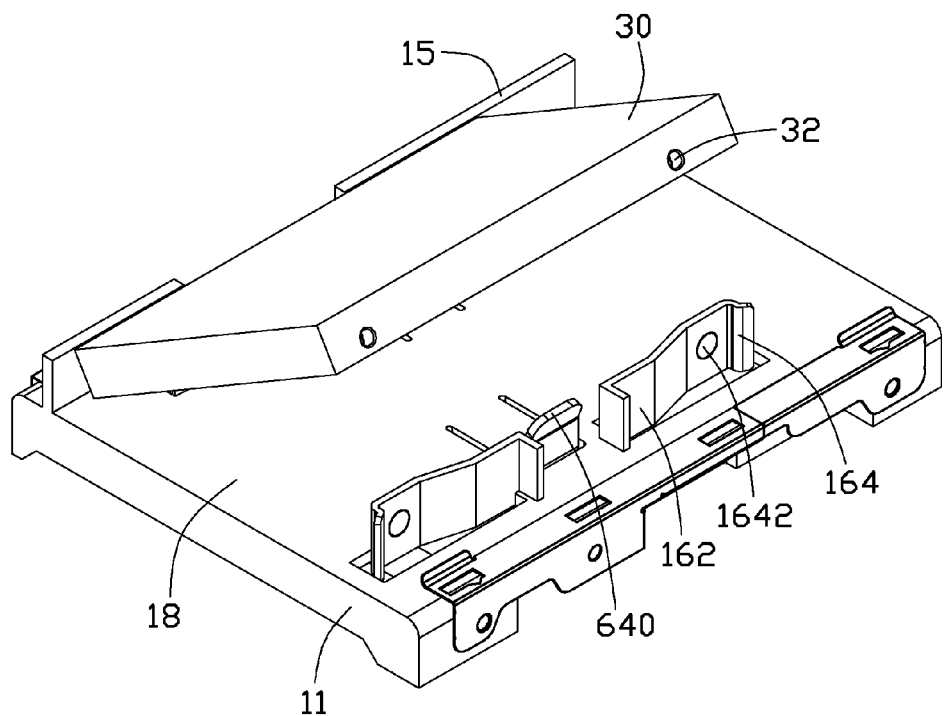
FIG. 4 is a schematic view of the holding assembly in FIG. 1, showing the second hard disk drive being assembled.
Figure 5:
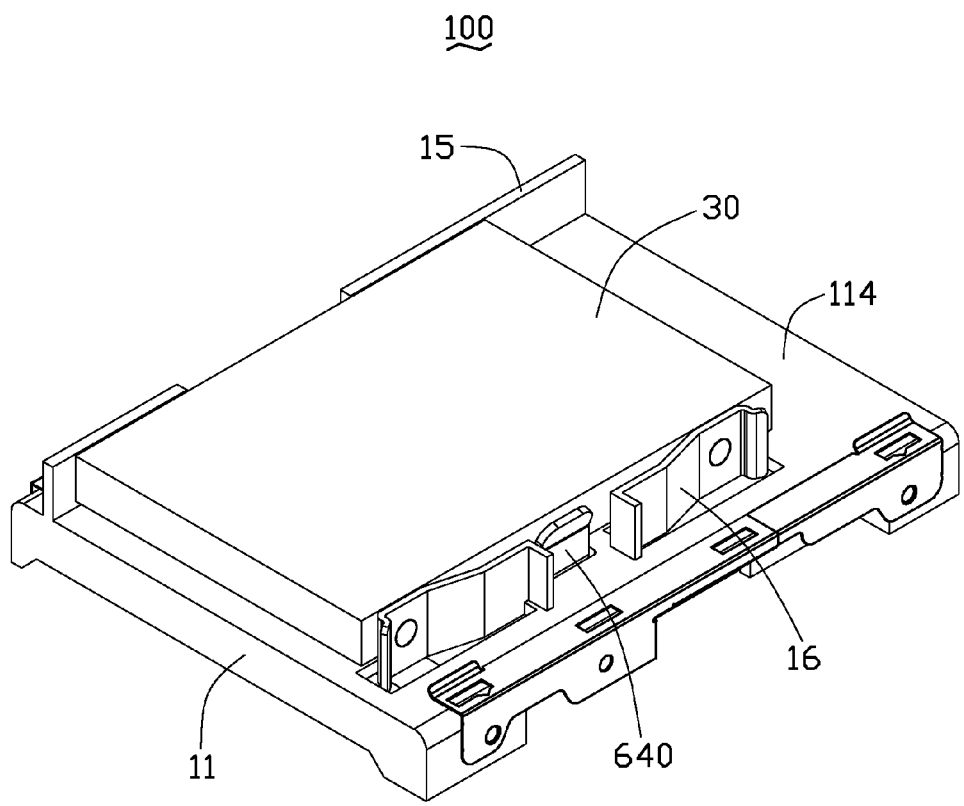
FIG. 5 is an assembled view of the holding assembly, showing the second hard disk drive attached on the holding frame.
Figure 6:
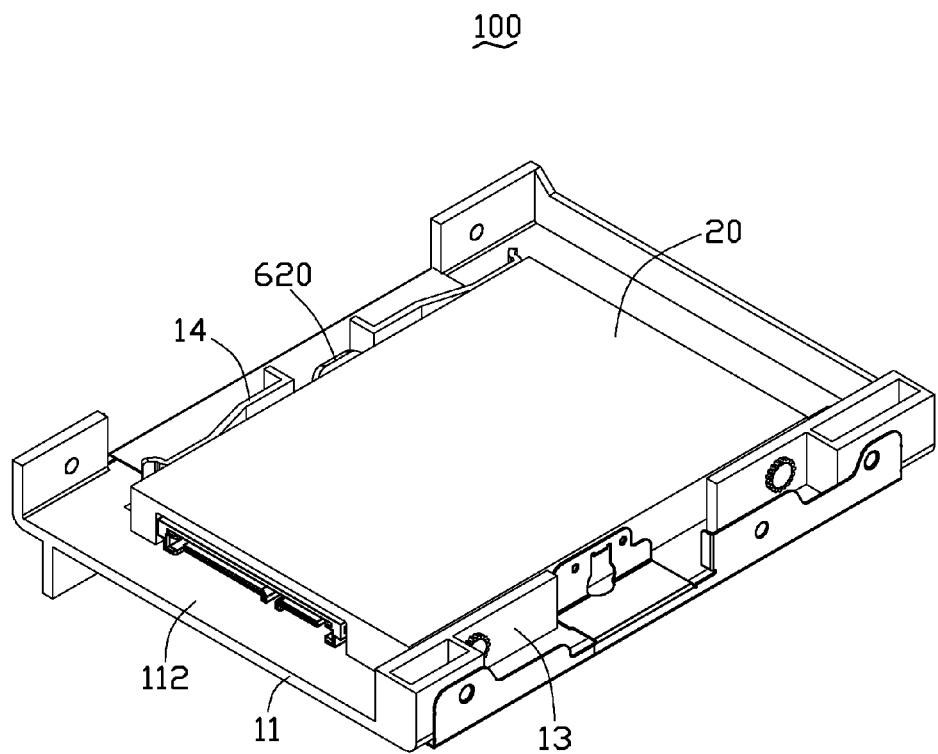
FIG. 6 is an assembled view of the holding assembly, showing the first hard disk drive attached on the holding frame.

Referring further to FIGS. 4 to 6, to assemble the second hard disk drive 30 to the second receiving space 18 of the holding frame 10, one side of the second hard disk drive 30 faces the second resisting wall 15, and allows the pins 152 to be inserted into the holes 32 at one side of the second hard disk drive 30 to mount one side of the second hard disk drive 30 on the holding frame 10. The second elastic arms 16 are pushed away from the second resisting wall 15 and the second tab 640 is pressed downwardly. At the same time, another side of the second hard disk drive 30 is pressed downward. The second rivets 1642 are latched in the holes 32 at another side of the second hard disk drive 30.

The assembly process of the first hard disk drive 20 is similar to the second hard disk drive 30, thus further details are omitted. Both the first elastic arms 14 and the second elastic arms 16 can be deformedly pressed to enlarge the first receiving space 17 or the second receiving 18, respectively. Additionally, the cantilever plate 62 and the second cantilever plate 64 can be deformedly pressed to allow the first tab 620 and the second tab 640 to offset from a corresponding first receiving space 17 or second receiving space 18. Thus, the first hard disk drive 20 and the second hard disk drive 30 can be conveniently assembled on the same holding frame 10.

Understandably, the first receiving space 17 and the second receiving space 18 may have different sizes, and thus, the present holding frame 10 can be used for mounting two different sizes of hard disk drives.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A holding frame comprising:
a base plate including a first surface and a second surface opposite to the first surface, two first slots and two second slots are defined in the base plate;
a first resisting wall extending from the first surface, the two second slots are adjacent to the first resisting wall, a second resisting wall extending from the second surface, the two first slots are adjacent to the second resisting wall, and the first resisting wall and the second resisting wall being reverse symmetric;
two first elastic arms are integrally formed on the first surface at the two first slots, and facing the first resisting wall, the two first elastic arms and the first resisting wall defining a first receiving space configured for receiving a first hard disk drive, one side of each of the two first elastic arms is coplanar with the second surface, and another side of the each of the two first elastic arms protrudes from a respective first slot of the two first slots toward the first surface; and
two second elastic arms are integrally formed on the second surface at the two second slots, and facing the second resisting wall, the two second elastic arms and the second resisting wall defining a second receiving space configured for receiving a second hard disk drive, one side of each of the two second elastic arms is coplanar with the first surface, and another side of the each of the two second elastic arms protrudes from a respective second slot of the two second slots toward the second surface.

2. The holding frame as claimed in claim 1, wherein a first cantilever plate and a second cantilever plate are formed on the base plate, the first cantilever plate is positioned between the two first elastic arms, and the second cantilever plate is positioned between the two second elastic arms.

3. The holding frame as claimed in claim 1, wherein:
the each of the two first elastic arms includes a first tilted plate and a first mounting plate integrally formed together, a first rivet is formed at the first mounting plate for mounting in one side of the first hard disk drive, and
the each of the two second elastic arms includes a second tiled plate and a second mounting plate, a second rivet is formed at the second mounting plate for mounting the second hard disk drive.

4. A holding assembly comprising:
a first hard disk drive;
a second hard disk drive;
a holding frame defining a first receiving space for receiving the first hard disk drive, and a second receiving space for receiving the second hard disk drive, the holding frame further includes a base plate with a first surface and a second surface opposite to the first surface, two first slots and two second slots are defined in the base plate;
a first resisting wall extends from the first surface, the two first slots are adjacent to the second resisting wall, a second resisting wall extends from the second surface, the two second slots are adjacent to the first resisting wall, and the first resisting wall and the second resisting wall are reverse symmetric;
at least one first elastic arm is integrally formed in the first receiving space at the two first slots, one side of each of the at least one first elastic arm is coplanar with the second surface, and another side of the each of the at least one first elastic arm protrudes from a respective first slot of the two first slots toward the first surface;
at least one second elastic arm is integrally formed in the second receiving space at the two second slots, one side of each of the at least one second elastic arm is coplanar with the first surface, and another side of the each of the at least one second elastic arm protrudes from a respective second slot of the two second slots toward the second surface,
wherein the at least one first elastic arm and the at least one second elastic arm are deformedly pressed to enlarge the first receiving space or the second receiving space respectively for assembling the first hard disk drive and the second hard disk drive.

* * * * *